(12) United States Patent
Edwards (10) Patent No.: US 7,911,710 B2
(45) Date of Patent: Mar. 22, 2011

(54) TELEMICROSCOPIC APPARATUS FOR THE ENHANCEMENT OF SIMULTANEOUS BI-LEVEL TELESCOPE VIEWING OF OBJECTS BOTH FAR AND NEAR

(75) Inventor: D. Brandon Edwards, Virginia Beach, VA (US)

(73) Assignee: Edwards Optical Corporation, Virginia Beach, VA (US)

( * ) Notice: Subject to any disclaimer, the term of this patent is extended or adjusted under 35 U.S.C. 154(b) by 643 days.

(21) Appl. No.: 11/901,456

(22) Filed: Sep. 17, 2007

(65) Prior Publication Data

US 2008/0094731 A1    Apr. 24, 2008

Related U.S. Application Data

(60) Provisional application No. 60/845,337, filed on Sep. 18, 2006.

(51) Int. Cl.
  *G02B 13/00*  (2006.01)
  *G02B 15/14*  (2006.01)
  *G02B 7/02*   (2006.01)

(52) U.S. Cl. .................... 359/744; 359/819; 359/704

(58) Field of Classification Search .............. 359/368, 359/399–409, 819–823, 744, 694–704
See application file for complete search history.

(56) References Cited

U.S. PATENT DOCUMENTS

| | | | |
|---|---|---|---|
| 4,877,316 A * | 10/1989 | Edwards et al. | 359/409 |
| 5,004,332 A | 4/1991 | Edwards | |
| 5,052,790 A * | 10/1991 | Edwards et al. | 359/399 |
| 5,121,251 A | 6/1992 | Edwards | |
| 5,189,560 A * | 2/1993 | Edwards et al. | 359/744 |
| 7,021,776 B2 * | 4/2006 | Nagae | 359/507 |
| 7,684,137 B2 * | 3/2010 | Yamazaki | 359/826 |
| 2003/0197928 A1 * | 10/2003 | Hirunuma et al. | 359/402 |

OTHER PUBLICATIONS

"Light Absorbing Blackout Material," [retrieved on Sep. 16, 2007]. Retrieved from Internet URL:.

* cited by examiner

*Primary Examiner* — Mohammed Hasan
(74) *Attorney, Agent, or Firm* — Hamilton, Brook, Smith & Reynolds, P.C.

(57) ABSTRACT

Miniature telescopes of both Galilean and astronomical design are fashioned to allow bi-level viewing, simultaneously, of both magnified scope images and non magnified normal images of both far and near objects or areas. Improvements in bi-leveling telescopes involve: objective lens aspherics, ocular lens materials of high refractive indices, anti-reflective fabric like materials for internal light control. This combination of innovations results in a bi-levelable miniature telemicroscope displaying wider magnified fields which display brighter and clearer imagery. Peripheral chromatic and spherical aberrations are considerably reduced even in shorter length telescope units. These shorter length scopes are spectacle mounted in such a way that the front surface of a spectacle carrier lens is coplanar with the telescope objective lens. Tintings and other coatings can now be applied to any of the scope's lenses or internal disks as well as to spectacle carrier lenses.

18 Claims, 4 Drawing Sheets

# TELEMICROSCOPIC APPARATUS FOR THE ENHANCEMENT OF SIMULTANEOUS BI-LEVEL TELESCOPE VIEWING OF OBJECTS BOTH FAR AND NEAR

RELATED APPLICATION

This application claims the benefit of U.S. Provisional Application No. 60/845,337, filed on Sep. 18, 2006. The entire teachings of the above application are incorporated herein by reference.

BACKGROUND OF THE INVENTION

In the year 1985, a patent for a miniature bi-leveling telemicroscope for simultaneous viewing of both magnified and non magnified scope images was issued. From that time period through 1993 several more patents of a related nature were issued to D. B. Edwards, et al. These patents were related to improvements in the original 1985 patent design. The parameters of these bi-leveling miniatures were thereby expanded. These parameters are held in common with large conventional and miniature spectacle mountable telescopes. These parameters include scope image field width, peripheral clarity, internal light control, scope weight, scope appearance, and clear depth of field. This expansion of scope parameters was intended to increase the number of possible scope users; especially for low vision patients. Innovations diminished image peripheral aberration, and further decreased housing internal wall reflected ambient light. Internal housing baffling not only controls image-disrupting reflected light, but also restrains peripheral chromatic and spherical aberrations. These prior patents, all of which are incorporated by reference herein in their entireties, include:

1. U.S. Pat. No. 4,540,238—1985
2. U.S. Pat. No. 4,877,316—1989
3. U.S. Pat. No. 5,004,332—1991
4. U.S. Pat. No. 5,052,790—1991
5. U.S. Pat. No. 5,121,251—1991
6. U.S. Pat. No. 5,189,560—1993

Equations dating back to 1985 reference the governance of reflection and aberration as well as the direct bi-leveling visual effects of these miniature scopes.

I. $L_A/D_L=10/3$; (U.S. Pat. No. 4,540,238)
  $L_A$=the barrel length for the ocular lens
  $D_L$=average barrel diameter of the ocular lens and
II. $\alpha=\theta/m^{-1}$ (U.S. Pat. No. 5,189,560);
  $\theta$=the angle between the horizontal plane and the central line of sight of the eye, FIG. 4 at 29.
  m=the magnification power of the bi-level scope
  $\alpha$=the bi-level tilt angle for the scope's central optical axis. This angle is illustrated in FIG. 2b of U.S. Pat. No. 4,877,361 issued in 1989 and the present FIG. 4 at 30.

The original internal anti reflection light control was governed by "fibrating" the entire length of the ocular lens barrel wall. The fibration tool, FIG. 6 at 35, was employed to achieve an ocular housing wall lined with fibers ripped from this internal housing wall by the tools sharp blades, FIG. 6 at 36. Eventually, internal baffling was introduced for internal light reflection and image peripheral aberration control, U.S. Pat. Nos. 5,004,332 and 5,121,251.

SUMMARY OF THE INVENTION

The bi-leveling magnification control served well in its operation for two decades. However, limitations in the magnified image field of view, general image brightness, peripheral aberrations, as well as scope length (particularly for higher powered scope units) were designed to improve scope characteristics.

The great depth-of-field which was inherent in the original miniature scopes (described in U.S. Pat. No. 4,540,238: 1985 Edwards, et al.) is now maintained in the present invention in a different manner. This great field depth of clarity in scope imagery is still basically governed by the internal diameter of the scope image. In the original telemicroscopic apparatus, both field depth clarity and image field width were governed by scope internal diameters. As will be detailed, the present controlling factors are not only different but also superior to those of the earlier miniature telescope technology.

The shading for ambient light outside of the miniature scope through the spectacle mounting was and is important. The scope image clarity or sharpness is of prominent importance. This spectacle shading application is still beneficial for maintaining miniature image clarity and image field width. Scope internal redesign or modifications in the present invention have done much to enhance scope image parameters.

The present telemicroscopic devices, both Galilean and astronomical in design, in a very positive manner enhance the image field in several ways:
  1. Field width;
  2. Sharpness or clarity of imagery;
  3. Brightness or luminosity levels; and
  4. Field, depth clarity.
  5. Internal ambient light control.

Miniature telescope fabrication was based on contact lens-making technology. This fabrication marked the beginning of miniature bi-leveling telescope technology development. Although these earlier miniature scopes and performance parameters were limited, they performed very satisfactorily for the low vision patient who could use them.

Any improvements in miniature scopes would improve life qualities of present scope users. The present upgrades will make possible the inclusion of many other low vision patients who were not able to take advantage of the earlier patented miniature scope model, for whatever reasons. New and innovative scope making materials, such as plastics, and newly upgraded scope fabrication processes have made possible scope parameter advancements.

Certain telescope embodiments of the invention comprise a lens barrel having an interior surface, an objective lens seated at a first end of the barrel and an ocular lens seated at a second end of the barrel. Fibrous material is applied to the interior surface of the barrel to absorb stray light within the barrel. The fibrous material provides for superior light absorption to minimize internal reflections within the barrel with a more open structure than was obtainable with fibrated fibers ripped from internal housing wall or with internal baffles.

The preferred fibrous material is a fabric having at least 20 black fibers per square mm, preferably greater than 40 fibers per square mm. It is preferred that the fibers be less than 0.5 mm long.

With a more open interior to the barrel, the outer peripheries of the objective and ocular lenses contribute to the formed image. To minimize image aberrations of the lens peripheries, the objective lens may be aspheric and the ocular lens may have a refractive index of 1.6 or greater, allowing for a flatter lens curve about a longer radius. To minimize weight, the entire scope is made of plastic.

A larger useful diameter of the objective lens allows for greater luminosity, but to meet the requirements of some patients, the light passed through the telescope can be reduced by an objective lens retaining ring with a smaller aperture diameter. The wide diameter through the barrel and at the ocular result in a wider field of view. Whereas, prior miniature Galilean telescopes of length less than 30 mm have been limited to a field of view of less than 8° in bright light conditions, present embodiments my obtain a field of view of greater than 8°, preferably great than 10° in bright light conditions. Lower light conditions result in an even wider field of view. Whereas, prior systems might increase from a 6° field of view in bright light conditions to great than 20° at dusk, the present telescope may demonstrate an increased field of view from 10° in bright light conditions to 30° at dusk.

By setting the telescope at a tilt angle relative to horizontal, bi-level viewing as provided in prior devices is obtained. However, the wider field of view enables the telescope to be positioned higher relative to the primary viewing access thus resulting in an angle θ, of the eye's axis when viewing directly through the center of the ocular, greater than 11°, as compared to 10° in prior devices. The increased angle θ results in an increased tilt angle in accordance with the equation $\alpha=\theta/(M-1)$ where M is the magnification of the telescope.

The various disclosed embodiments are particularly suited to mounting in spectacles for bi-level viewing. However, other applications disclosed in applicant's prior patents such as in a weapon sight are also enhanced.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The following figures illustrate the unique technological advancements in the field of miniature bi-leveling telescopes which are spectacle mounted.

Figure 1:
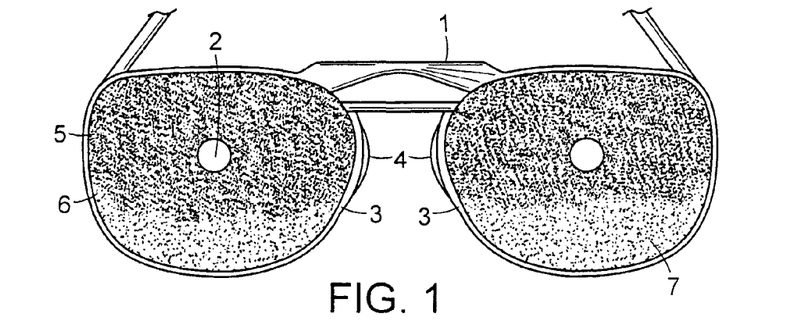
FIG. 1 illustrates an embodiment of the invention in which Galilean telescopes are mounted in spectacle lenses.

FIG. 1 displays a front view of the present telescope. The number 1 represents a stylish, yet sturdy and durable spectacle frame. The number 2 denotes one of two miniature spectacle scopes. Tinted spectacle lenses are at number 3. The nose pads are denoted by number 4. The number 5 shows the darkly tinted upper portion of the carrier lens. The transition zone from darker to lighter tin is at number 6. At the number 7, a lighter tin gradient is shown.

Figure 2:
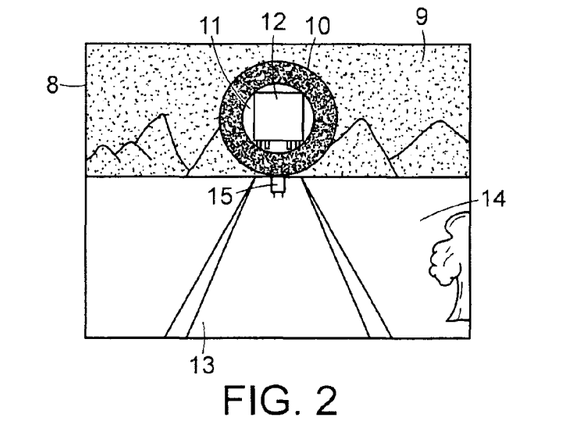
FIG. 2 illustrates bi-level viewing as would have been perceived using prior Galilean telescopes having baffles therein to reduce light reflection.

FIG. 2 illustrated a scope user's view of a landscape and the bi-level view of a distant object (truck) as seen by the earlier miniatures. The number 8 denotes a landscape with a bi-level display. At number 9 the foreground of the landscape appears. The number 10 indicates a think, scope wall and baffles which rims the scope image. A cylindrical, magnified image appears in the scope at number 11. The number 12 is a magnified image of a distant area. The highway at the number 13 is in the mid ground of the landscape.

Figure 3:
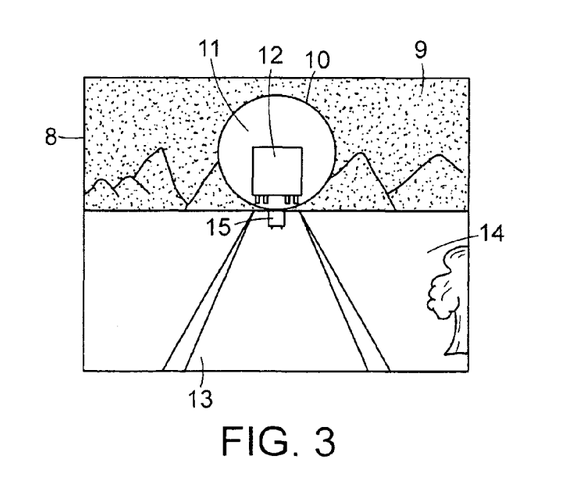
FIG. 3 illustrates improved bi-level viewing utilizing telescopes of the present invention.

FIG. 3 shows the landscape highlighting a bi-leveled view of a distant object. The number 8 is a landscape view showing a bi-level illustration. The foreground of the landscape is at the number 9. A thin scope wall at number 10 is seen with a scope of the present invention. A magnified image field is seen through the present scope at number 11. A magnified view of the truck at number 12 is unobstructed. The number 13 is of a highway in midground, unmagnified. The number 14 denotes a flat midground landscape with a tree. A nonmagnified view of the truck below the scope is displayed at number 15.

Figure 4:
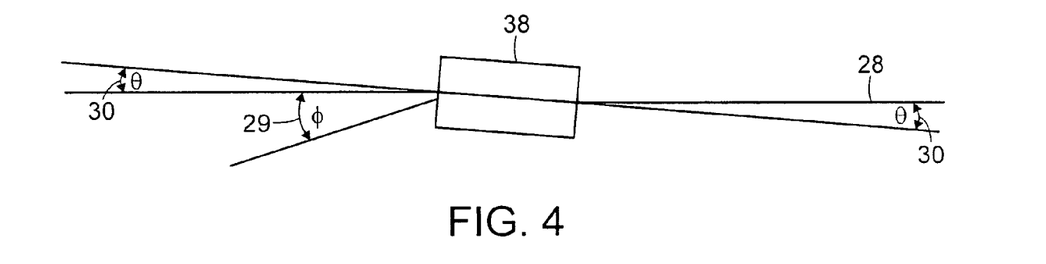
FIG. 4 illustrates the tilt of the telescope for bi-level viewing.

FIG. 4 is a graphic depiction of a side view of the present scope angled to the horizontal plane. This scope tilt angle α provides for bi-level viewing. The number 28 is a line within a plane which parallels the horizontal plane. The number 29 is the center line of sight for the eyeball when the user is looking directly at the scope image. The upward scope tilt angle α allows for bi-leveling and is denoted at number 30. The number 38 is a side view of bi-leveled scope.

Figure 5:
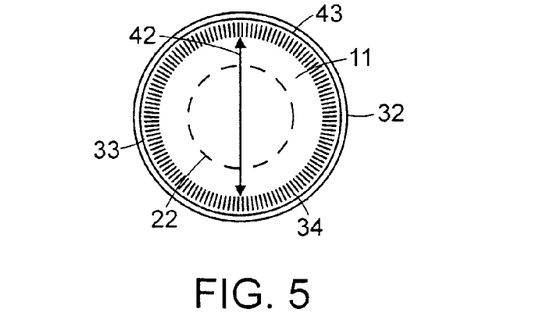
FIG. 5 is an end view of a telescope barrel having fibers extending from the inner wall.

FIG. 5. depicts the relationship between the ocular lens barrel and the fiber lined velvet-like fabric attached to the barrel's inner wall. These fibers align toward the middle of the barrel. The number 32 denotes the barrel shaped ocular lens housing. The fabric from which the hair-like fibers protrude is noted at the number 33. The fabric filament fibers, at number 34, absorb internal ambient light. Number 11 indicates the area on which is located the image field. Number 22 represents, in a well lit environment, the field diameter of images seen in earlier miniature telescopes. The larger image field diameter fro the present invention is at number 42.

Figure 6A:
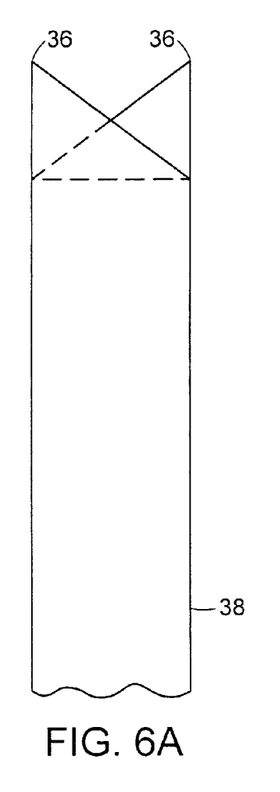
FIGS. 6A and 6B are orthogonal views of a fibrating tool used to create fibers extending from the internal walls of prior telescopes.
Figure 6B:
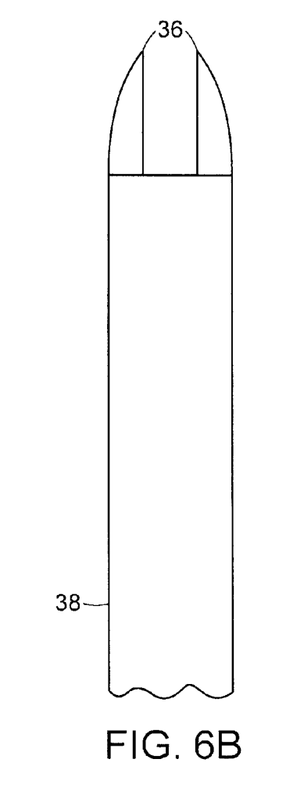

FIG. 6 describes the ripping tool previously used to create fibers protruding from the barrel inner wall surface. Number 35 denotes the tool shaft. The tool blade points 36 generate fibers anchored to the scope inner wall. Less than 10 fibers per square millimeter, typically less than 6 fibers, would be obtained.

Figure 7:
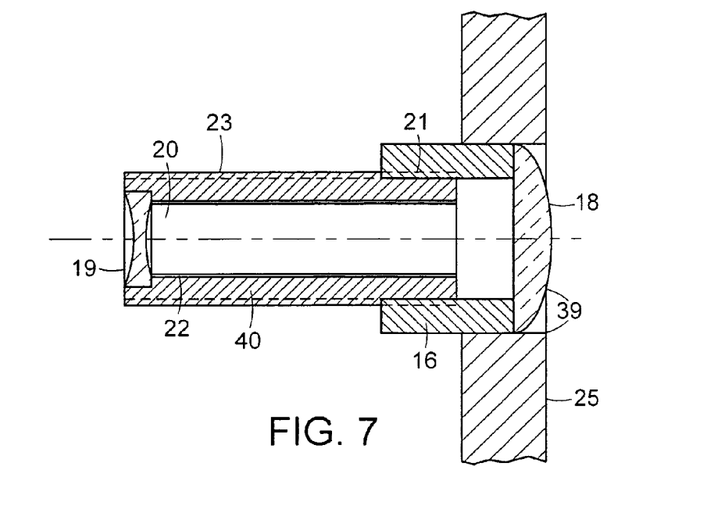
FIG. 7 is a longitudinal sectional view of one embodiment of the invention.

FIG. 7 is a graphic replication of a typical early miniature design modified to include the present improved features. The spectacle lens used for a flush mounting, number 39, is number 25. The ocular lens barrel 40 and the objective lens barrel 16 house the ocular lens 19 and objective lens 18, respectively. Internal barrel threading 21 and external barrel threading 23 facilitate focal adjustments. Inner wall fiber lining 22 in this improved design absorbs light rays that strike them. The hollow zone of the ocular barrel 20 is where the object image is seen by the ocular lens.

An appropriate fibrous material is the velvet-like light absorbing blackout material available from Anchor Optics for light trapping, baffling and beam stopping (www.anchoroptics.com). Spray on fibrous materials are also available.

Figure 8:
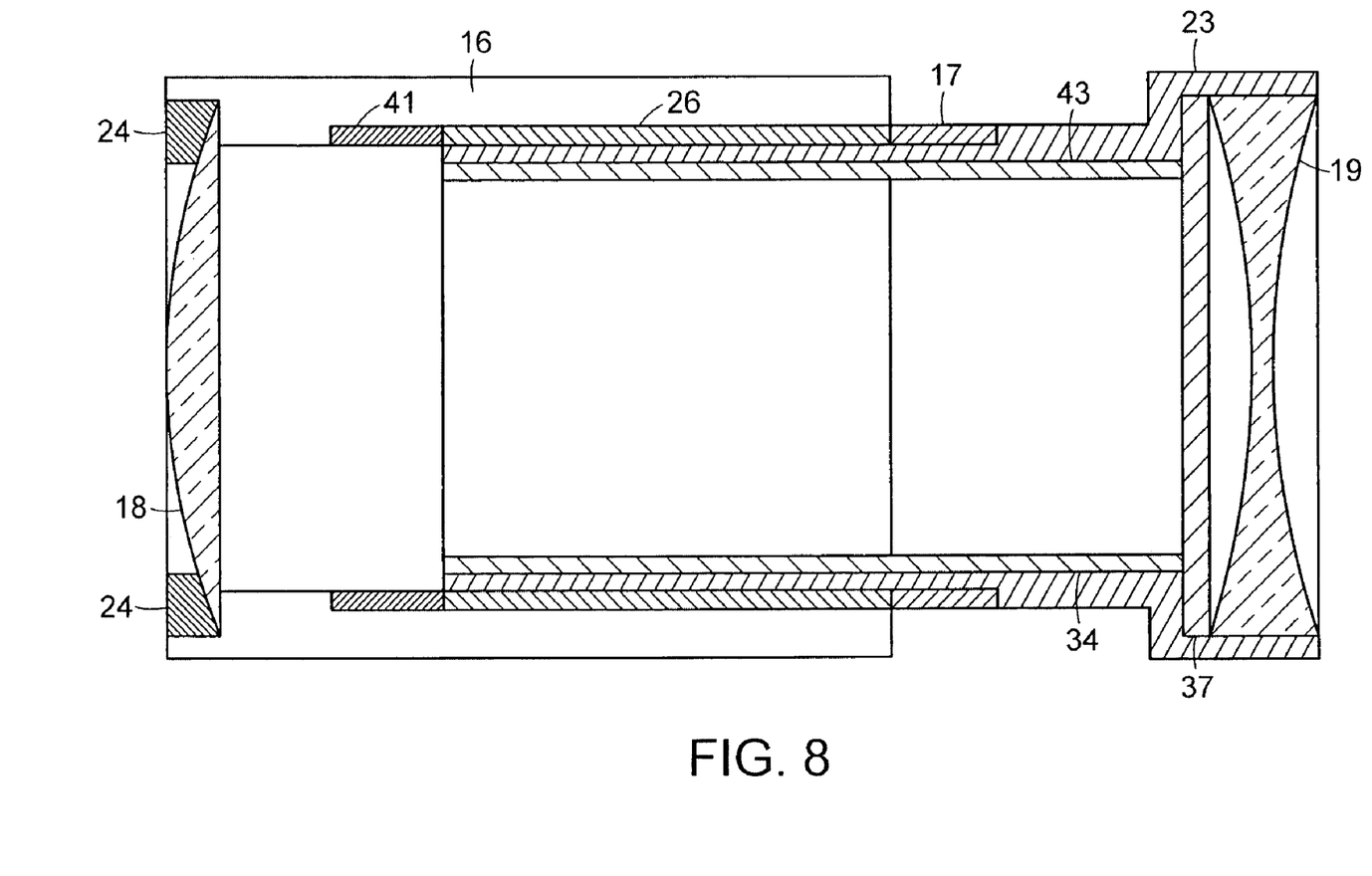
FIG. 8 is a longitudinal sectional view of an alternative and more preferred embodiment of the invention.

FIG. 8 illustrates a preferred embodiment of the present invention. The objective lens 18 fits into a countersunk portion of its barrel, held in place by a retainer aperture ring 24. The ocular lens 19 pressure fits into a counter sunk portion of its barrel. A clear tinted disk 37 may or may not be used at this location. A velvet-like fabric lined with hair-like fibers covers the inner housing wall of the ocular lens. The hair-like fibers protrude from a fabric 34. The ocular and objective lenses are housed in barrels 23 and 16 respectively. The objective barrel internal threading 41, and the ocular barrel external threading 17, interface at 26 for focal adjustment. The fabric fibers 34 are located along the inner wall 43 of the ocular lens barrel.

These scope technological improvements will now be explained in detail. And it should be noted at this time that almost all scope image enhancements involve the clarification of scope peripheral aberrations such as spherical and chromatic. In addition, it should also be noted that with the present scopes, the widening of the image field allows for the close association of both the magnified, above, and the non magnified, below, imageries which are now closer to each other at their peripheral boundaries. Hence, obtaining and maintaining the bilevel visual effect is made much more easily attainable, FIG. 3, numbers 10 and 15. The tilt down angle of the bi-leveled, earlier telescope relative to the horizontal is shown at 30 mm, FIG. 4. The tilt was governed by the equation $$\alpha = \frac{\theta}{m-1}$$

where θ was 10°.

The bi-leveled scopes can now be tilted more then the original miniature scopes were. As a result of major technological advancements, the present scopes are tilted according to the formula $$\alpha = \frac{\theta}{m-1}$$

(FIG. 4, α at 30) where α is the scope central axis relative to the horizontal and θ is the angle of view of the eye angled up to view the center of the ocular lens. In prior devices, θ has been 10°, but it can now be increased to the range of 10° to 18°, preferably about 15°, by moving the barrel upward. Consequently, bi-leveling of higher powered and larger diameter scopes can be greatly expanded. Further more, the lengths of all scopes can be made shorter. These shorter miniatures can be flush mounted with respect to the front face of the spectacle lens (FIG. 2 at 39) without diminishing the field of view and luminosity levels.

The control of both external ambient light levels as well as scope inner wall reflectable light, both of which interfere with the overall clarity or sharpness of the scope image, is extremely important. As with the earlier miniature bileveling telemicroscopes, external ambient light can be limited in its negative effects on scope imagery perception by tinting or coating the scope spectacle carrier lenses around the scopes. In addition, spectacle temple mounted, and tinted side shields can be applied. These shields are usually made of tintable plastic which resemble those shields of safety glasses.

The addition of tinted spectacle "sun shades" over spectacles in which scopes are mounted will also produce an overall ambient light shading effect. Before the introduction of the prior denoted miniature bileveling scopes with internal anti-reflective baffling, the inner scope housing walls were made to be anti-reflective by the use of a "fibrating" tool denoted in drawings FIG. 6. With this tool the inner wall housing of the ocular lens was ripped and torn away from the inner wall surface. The resulting hair-like fiber extensions trapped light passing through the telemicroscope. This passing light in part would have ordinarily been reflected back into the image field were it not for these wall fibers. This fabrication process eventually lead to the patenting of the baffling for scope housing inner walls. These baffles serve the same purpose for absorbing scope internal light reflection control as did the original wall fibration. Without this internal light reflection control, the scope imagery would appear to be much less sharp or foggy in appearance.

The characteristics of scopes disclosed here eliminate limitations which existed for the earlier miniature bileveling telemicroscopes.

A list of improvements to previously disclosed miniature bileveling telemicroscopes that may be included individually or in combinations is as follows:

I. Aspheric curvatures are now employed on the cover surface of the scope's objective lens FIG. 8, number 18.

II. Higher than standard 1.49 refractive index materials, i.e. greater than 1.60, are now used to fabricate the symmetric biconcave ocular scope lenses FIG. 8, number 19.

III. Scope housing, internal walls are now lined with a fabric or other coating having fibrous surface protrusions (FIG. 5 and 8, 34 and FIG. 7, 22) to eliminate internally reflected extraneous or ambient light. This cloth fabric is black in color and traps light rays entering the scope and striking it. This trapped light does not enter the field of view of the image. Hence, the scope image remains sharp and devoid of cloudiness or haziness.

It should be noted that the above numbers I, II and III, combine to reduce or eliminate both spherical and chromatic peripheral aberrations ordinarily previously observed.

IV. Due to the fibrous internal coating, the present scopes no longer require internal baffles to control brightness or image peripheral aberrations.

V. An objective lens retainer ring has an aperture stop with a diameter which aides in image brightness control (FIG. 8, number 24). The diameter of this stop is dictated by scope power and patient requirements. The stop diameter can also aid in eliminating image peripheral aberrations.

VI. The barrel housing designs with internal fibrous coating lend themselves to the maximized absorption of ambient internally reflected light. This can be seen in the drawings of FIGS. 3 and 8.

VII. Coatings on scope transparent surfaces such as lenses and clear disks 37 (FIG. 8) are now used. These coatings are applied to those surfaces for anti-reflective tinting purposes. Patient visual requirements often require customized coating arrangements.

VIII. Due primarily to items I, II and III, it is now possible to increase both scope external and internal diameters while maintaining satisfactory image clarity.

IX. The visual bileveling effect can now be extended to include higher powered scopes with larger internal and external diameters.

X. As a result of the aforementioned technological advances, scopes can be made to be shorter in length at higher powers. This characteristic makes possible the spectacle lens flush mounting of a wider variety of scope powers and diameters. Flush mounting here can be described as having the objective lens diameter plane near coincident with the plane of the front surface of the spectacle lens in which the scope is mounted as in FIG. 7 at 39. The objective lens barrel may be less than 20 mm long, and the negative lens barrel may, for example, extend 10-11 mm behind the spectacle lens. These barrels are denoted in FIGS. 7 and 8 as 16 and 23, respectively.

Equations which govern the operation of earlier miniature bileveling telescopes (Edward, et al.) can now be modified to accommodate the advancements reflected here. The following formulas explain the alterations which have been made in the earlier bileveling scope equations.

| Earlier telemicroscopes vs. | Present Scope Example |
|---|---|
| I. 1985, Patent No. 4,540,238 LN/DLN = 10/3 Where: LN = the length of the ocular lens barrel; and DLN = the internal diameter of the ocular lens barrel | dblc/olad = 10/5 or 10/6 Where: dblc = the distance between scope lenses' centers; and olad = the objective lens aperture diameter |
| II. 1989, Patent No. 4,877,316 $\alpha = \theta/(M - 1)$ Where: $\theta$ = the angle, (10°), between the horizontal and the eye's center viewing axis with the eye rotated upward so as to see through the above mounted bi-leveling scope; and M = scope magnification, typically in the range of 2.5 to 6, most typically in the range of 3 to 5; and $\alpha$ = the angle between the horizontal and the tilted center axis of the spectacle mounted scope of FIG. 4. | $\alpha = \theta/M - 1$ The above symbols are defined in exactly the same way as in the previously described equation, $\alpha = \theta/(M - 1)$ where $\theta$ is no longer 10°, but rather about 10°-18°, preferably 15°, for the present scopes. |

The following equations describe the relationship between focal lengths and radii of curvature for two materials with different refractive indices. The conversions of focal lengths and radii from one material to the other are being applied here strictly to the ocular lenses of the present scope. Knowing that the lensmaker's formula results in the equation for a negative lens is as follows: RC=0.98 FL, where: RC=lens radii of curvature and FL=lens focal length, it becomes mathematically simple to manipulate, especially through substitution, the conversion formula:

$$\frac{FL_L}{\left(\frac{n_L - 1}{n_H - 1}\right)} = FL_H$$

so as to create the equation:

$$\frac{.98 RC_L}{\mu} = RC_H; \text{ and}$$

$$\left(\frac{.98}{\mu}\right) RC_L = RC_H; \left(\frac{.98}{\mu}\right)$$

is made to equal $\theta$

Hence, $\theta(RC_L) = RC_H$

The equation above is much more practical when determining the parameters of a negative lens using a higher refractive index material. The symbols in the two equations above are defined as follows:
$FL_L$=the focal length of the lens made from the lesser refractive index material. $FL_H$=the focal length of the same lens made with the higher refractive index material; and, the $\mu$'s represent the refractive indices of the two lens materials respectively. The RC's represent the radii of curvature of the two lens' materials respectively; and, $\mu$=the term $N_L$-1/$N_H$-1. Also, $\theta$=(0.98/$\mu$).

The use of an anti-reflective coating on any of the scopes' transparent surfaces, and in particular the negative lens, improves scope imagery brightness. This brightness or luminosity level can now be more accurately controlled by the objective lens retainer ring with central apertures. This scope image brightness control can be more easily patient-customized. For many low vision scope users, brightness control can be critical in optimizing their use of this miniature bileveling telescope.

The following may prove helpful in understanding derivation of the final set of equations.
Given:

$$fl_1 - fl_2 = dblc; \text{ where,} \quad \text{I}$$

$fl_1$=focal length of the objective lens
$fl_2$=focal length of the ocular lens
dblc=distance between scope lens centers. This distance dictates the telescope's basic length.

$$RC = 0.98 fl_2 \text{ where,} \quad \text{II}$$

RC=the radii of curvature of the symmetric ocular lens
$fl_2$=the focal length for the scope ocular lens
The lens material's formula was used to create this equation for a symmetric biconcave scope ocular lens.

The next equation and following equations derived from it are used to fabricate an ocular lens from high refractive indices [RI] materials. The primary aim in using these equations is to flatten the curves of the ocular lens thereby minimizing or eliminating scope image peripheral distortions. Also, the retaining of the focal length of the lens which would be fabricated from the standard 1.49 RI of a scope of the same power and length is necessary. Knowing the conversion formula for both objective and ocular lenses is:

$$III \quad \left[\frac{fl_L}{(n_1 - 1)/(n_2 - 1)} = fl_2\right] \text{ where,}$$

$fl_1$=the focal length of the lens with the lowest (on standard, usually 1.49) RI material.
$fl_2$=the focal length of the material with the highest RI; and,
$n_1$=the lower RI
$n_2$=the higher RI.
Using the mathematical laws for term substitutions in equation III;

$$\left[\frac{fl_L}{(n_1 - 1)/(n_2 - 1)} = fl_4\right]$$

becomes $$\frac{RC_L}{\mu(.98)} = \frac{RC_H}{(.98)}$$

where: $RC_L$=the radius of the curvature for the ocular lens using the lower RI material, $RC_H$=the radius of curvature for the new lens made from the lower and higher RI material, and, $$\mu = \frac{(n_L - 1)}{(\mu_H - 1)}.$$

Hence, $.98\left[\left(\frac{RC_L}{.98}\right)\left(\frac{1}{\mu}\right)\right] = .98\left[\frac{RC_H}{.98}\right]$, -continued $$(RC_L)\left(\frac{.98}{\mu}\right) = RC_H \text{ and,}$$

$$IV \quad \frac{.98 RC_L}{\mu} = RC_H$$

where $RC_L$=the radii of curvature of the lens made with the lower RI (taken to be approximately 1.49) material.
In the following example using the above formula (IV), knowing the higher RI for the material being used for this conversion, the following transformation can be performed. Given:
[$RI_L$=1.49] and [$RI_H$=1.60]; and $RC_L$=0.98 $fl_L$; and $fl_L$=5 mm. And, hence, $RC_L$=(0.98)(5)=4.9 mm.
The focal lengths for both the lower and higher RI materials from which these lenses are made are being held equal during this conversion. Hence, using the refractive indices of 1.49 and 1.60 and the formula $$\frac{.98 RC_L}{\mu} = RC_H,$$

where $$\mu = \frac{1.49-1}{1.60-1} = \frac{.49}{.60} = .817, \text{ and } \frac{.98}{.817} = 1.199 = \theta \text{ and,}$$

from the given equation [RC=0.98 fl] for the ocular lens, the following conversion formula emerges:

[1.99$RC_L$=$RC_H$]=[1.999(4.9)=$RC_H$]

and for this example, $RC_H$=5.87 mm for both ocular curves of this new lens.

Knowing $RC_L$'s value in the bracketed equation above, simple multiplication on the left side of the formula will equal the radii of curvature of the highest (RI) ocular lens. The focal lengths of both lenses are equal even though the radii of curvature of the higher RI ocular are flatter than those of the lower RI ocular lens.

An Example Embodiment

Because of the customized nature of the bi-leveling scopes, only an approximation of the specifications will be set forth here. What must be understood is that all of the upgraded technological components here described have never before been brought to coordinate with each other in a single miniature, telemicroscopic instrument. The equations and figures with accompanying numbers are now replacing much of what was referenced in previously cited known and patented materials. The previously cited miniature magnification devices as well as the present devices still range from 1 to 10 powers.

All powers of the present scopes can be flush mounted in spectacle carrier lenses. The carrier lens' dioptic power can vary widely. Here, "flush mounting" is defined as having the diameter plane of the objective scope lens coincident with the diameter plane of the front surface of the spectacle lens in which the bileveling scope is mounted (FIG. 7 number 39).

Reduction of scope image peripheral distortions is obtained by the use of:
1. aspheric parabolic flattening of the convex surface of the scope objective lens, and
2. the use of lens materials of higher than standard 1.49 refractive index for the scope ocular lens, e.g. greater than 1.60, allows for lens curve flattening.

Chromatic and spherical distortions in the scope image periphery detected in earlier mixed use telescopes are now minimized. And, the maximization of scope image field width, clarity, and depth-of-field can now be observed.

In addition, the present scopes case employ an objective lens retainer ring having a center aperture which can have a diameter dictated by the scope's power and diameter as well as patient needs.

The scope's barrel or housing wall is lined with a thin black fine material having fibers extending toward the center of the scope, FIG. 8, number 34. This lining absorbs what would normally be internally reflected light from a smooth internal housing wall. This absorbed light cannot negatively affect the magnified scope imagery. As a result, the scope imagery is clear and unclouded, permitting high image resolution.

Having a wider field scope image makes possible greater control of the bileveling capacity of these telescopes. What would normally be a very noticeable scope housing ring (FIG. 2, number 10) separating the magnified image from the non-magnified spectacle image below the scope becomes almost unnoticeable (FIG. 3, number 10). This more closely approximated bileveled magnified and non magnified imagery as observed by the scope user now makes possible the inclusion of larger diameter and higher powered scopes of the present invention. These scope diameters now can include diameters up to 19.05 mm with powers of up to 5.5. The bileveling capability of the present scopes, being expanded, would necessarily depend on the powers and the internal diameters, respectively, of the scopes being used.

The scope now being referenced as an example of the present invention, will have the power of 3.3×. The overall length will be approximately 13 mm so as to make possible a flush mounting (FIG. 7, number 39) in a carrier lens approximately 4 to 6 mm thick. The outer diameter and inner diameter are such that bilevel, simultaneous viewing of both magnified and non magnified objects or areas can be observed (FIGS. 2 and 3, numbers 12 and 15). The aforementioned diameters can range from 1.35 mm to greater than 19.05 mm. The objective's convex surface is aspherically shaped and the ocular lens material's refractive index can be as high as 1.85. The resultant flattened curved surfaces of the lens elements serve to produce a scope image diameter with clarity across a widened field.

The baffling used in miniature telescopes to this point in time may still be useful for use in light luminosity level and internal reflection control. Their descriptions are noted in U.S. Pat. Nos. 5,004,332 and 5,032,790, Edwards, et al. Most low vision patents are light sensitive and need the luminosity level of the exit pupil imagery decreased while maintaining as wide a field of view as possible.

Using aspheric and high refractive lens optics along with the light absorbing inner wall cloth liner best facilitates a wide field. Often a wide field necessitates high luminosity transmission. Baffles can not only be made to trap internally reflected light, they can also be made to limit the brightness of the scope image. For this reason baffles used in conjunction with or without absorbent housing liner cloth or spray on fibering remain an important option for use in the present scopes. The internal diameters of the baffles can be varied to accommodate the need of the scope user.

For scope image brightness control, cloth, or spray on fiber, or baffles, or a combination of these three entities can be used to enhance imagery detail on the exit pupil plane.

The present housing design denoted in FIG. 8 permits the wall fabric liner to absorb more internally reflected light than earlier scopes. This fabric now extends almost the entire distance between the lenses. The objective lens retainer ring with aperture, shown in FIG. 14 at 7, controls scope image luminosity levels and length of the depth of field. The smaller the internal diameter or the retainer/aperture ring the longer and clearer the field depth. This aperture diameter can vary widely depending upon scope specifications; here, it is approximately 7.0 mm. The scope housing thickness will be dictated by durability requirement which are designed to maintain the housing's circular diameter and prevent lens distortion. These housings are made basically of two moving parts. These parts are usually finely threaded to allow focal adjustment by the user.

As previously described in FIGS. 1-8, the basic design for the present scopes is detailed by number 1 through 43 which depict the present upgraded improvements. The present scopes, shown in FIG. 8, for the first time in the development of miniature scopes integrate all upgraded changes in the same instrument.

This example's specifications could be as follows:
1. 3.3× bileveling or non-bileveling scope. (e.g. 2.5× to 6×)
2. Outer diameter=9.52 mm. (e.g. 6 to 17 mm)
3. Inner diameter=5.0 mm. (e.g. 2 to 12 mm)
4. Scope length=13 mm (with infinity focus) (less than 30 mm)
5. Scope carrier mount=flush.
6. Plano-convex objective lens curve=aspheric design.
7. Ocular bi-concave lens (RI)=1.74 (1.6 or greater).
8. Inner wall liner=thin fabric tube.
9. Objective Lens retainer aperture ring=5.0 mm ID. (e.g. 2 to 12 mm)
10. Lens' coatings=antireflective and/or scratch resistant.
11. Internal ocular and objective disks 37 (if desired), FIG. 8, are grey to rose color.
12. Both ocular and objective lens barrels external and/or internal threading=72 per 25.4 mm. (Wide range feasible.)
13. Countersinks for both lenses are dictated by disk, lens, and aperture thicknesses.
14. Ocular lens and barrel may be focally adjusted from the forward or eye end of the scope.

Bibliography, incorporated by reference in their entireties:
Optics. W. H. A. Fincham, Seventh Edition, Hatton Press Ltd., Colombia House 69, London, 1965.
Fundamentals of Optics. F. S. Jenkins, H. E. White, McGraw-Hill, Fourth Edition c 1957, 1976.
Geometrical Optics. Glenn A. Fry, Principles of Optometry Series, Volume 2, Chilton Book Co., Philadelphia c 1969.
Edwards, D. Brandon; patent numbers:
1. U.S. Pat. No. 4,540,238—1985
2. U.S. Pat. No. 4,877,316—1989
3. U.S. Pat. No. 5,004,332—1991
4. U.S. Pat. No. 5,121,251—1992
5. U.S. Pat. No. 5,189,560—1993
6. U.S. Pat. No. 5,052,790—1991

While this invention has been particularly shown and described with references to example embodiments thereof, it will be understood by those skilled in the art that various changes in form and details may be made therein without departing from the scope of the invention encompassed by the appended claims.

What is claimed is:

1. A telescope comprising:
a lens barrel having an interior surface;
an objective lens seated at a first end of the barrel;
an ocular lens seated at a second end of the barrel; and
light absorbing fibrous material on the interior surface of the barrel;
wherein the ocular lens has a refractive index of 1.6 or greater.

2. A telescope as claimed in claim 1, wherein the ocular lens is plastic.

3. A telescope as claimed in claim 2.

4. A telescope as claimed in claim 3, wherein the lens barrel length is less than 30 mm.

5. A Galilean telescope comprising:
a lens barrel having an interior surface;
an objective lens seated at a first end of the barrel;
an ocular lens seated at a second end of the barrel; and
light absorbing fibrous material on the interior surface of the barrel;
wherein the lens barrel length is less than 30 mm, the objective lens is a plastic aspheric lens and the ocular lens is a plastic lens having a refractive index of 1.6 or greater.

6. A telescope as claimed in claim 5, wherein the fibrous material is a fabric.

7. A telescope as claimed in claim 6, wherein the interior surface of the lens barrel is cylindrical.

8. A telescope as claimed in claim 5, wherein the telescope is mounted at a tilt angle to horizontal to enable bi-level viewing.

9. A telescope as claimed in claim 8, wherein the tilt angle is about $\theta/(M-1)$, where $\theta$ is at least 11° and M is magnification of the telescope.

10. A telescope as claimed in claim 5 having a field of view greater than 8° in bright light condition.

11. A Galilean telescope comprising a lens barrel having a cylindrical interior surface:
a plastic aspheric objective lens seated at a first end of the barrel;
a plastic ocular lens having a refractive index of 1.6 or greater seated at a second end of the barrel; and
fibrous material on an interior surface of the barrel, the fibrous material having at least 20 fibers per square mm, the fibers being less than 0.5 mm long.

12. A Galilean telescope as claimed in claim 11, wherein the fibrous material is fabric.

13. A Galilean telescope comprising:
a lens barrel having a length less than 30 mm;
a plastic aspheric objective lens seated at a first end of the barrel; and
a plastic ocular lens having a refractive index of 1.6 or greater seated at a second end of the barrel.

14. A Galilean telescope as claimed in claim 13, wherein the outer diameter is less than 16 mm.

15. A Galilean telescope as claimed in claim 13 further comprising a fabric applied to an interior surface of the barrel.

16. A telescope as claimed in claim 13, wherein the telescope is mounted at a tilt angle to horizontal to enable bi-level viewing.

17. A telescope as claimed in claim 16, wherein the tilt angle is about $\theta/(M-1)$, where $\theta$ is at least 11° and M is magnification of the telescope.

18. A telescope as claimed in claim 13 having a field of view greater than 8° in bright light conditions.

* * * * *